Patented May 16, 1933

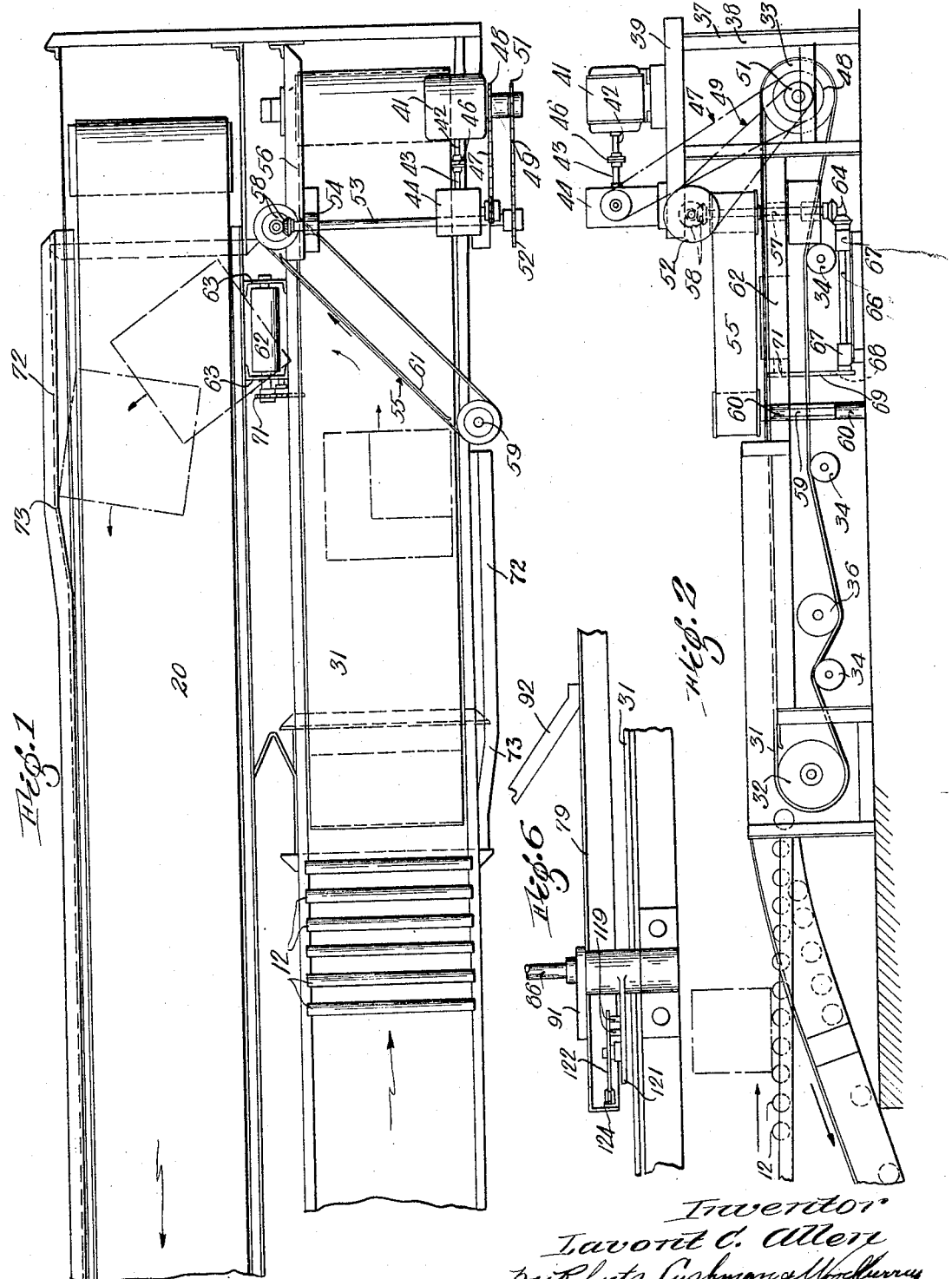

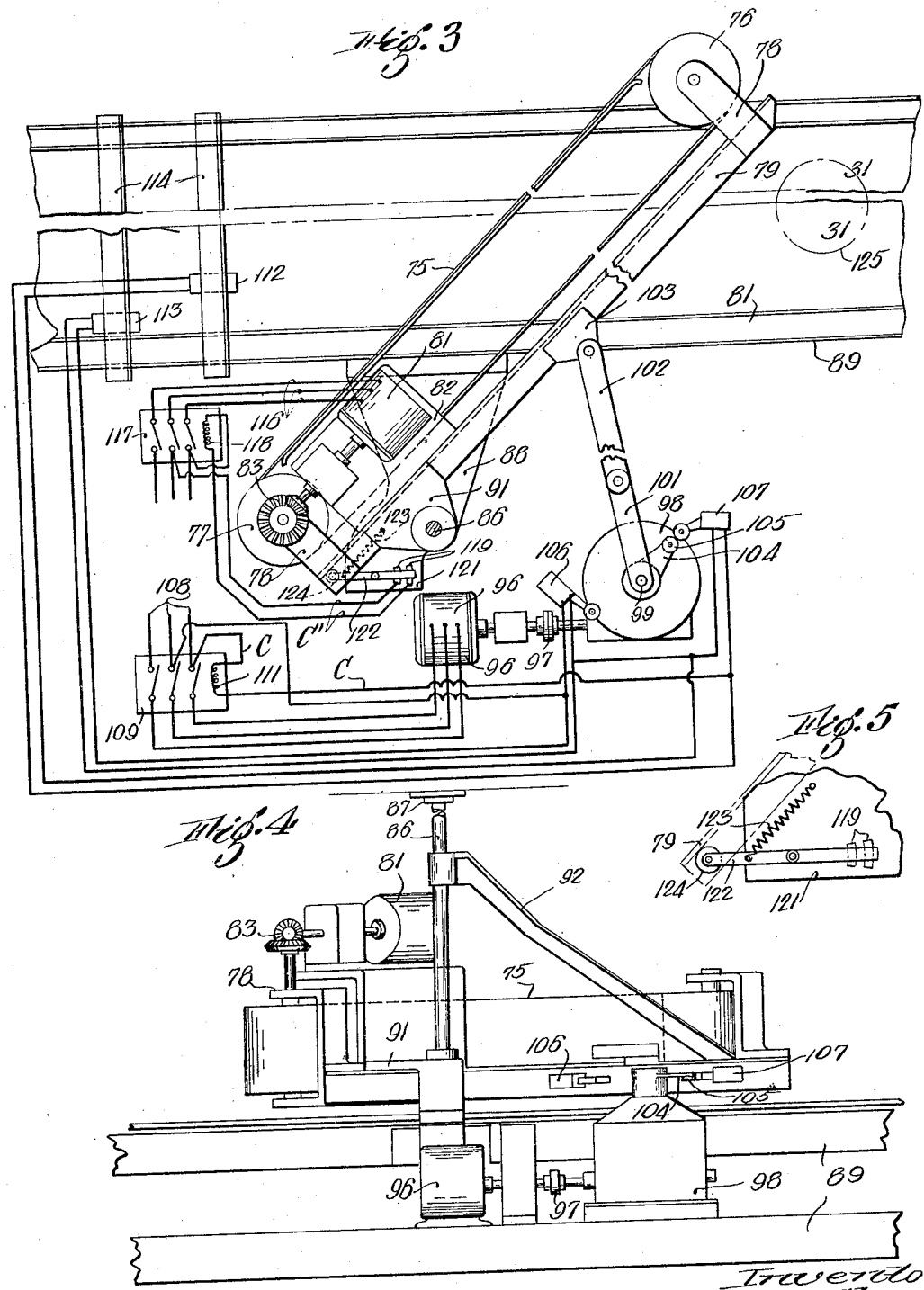

1,909,481

UNITED STATES PATENT OFFICE

LAVONT C. ALLEN, OF SYRACUSE, NEW YORK, ASSIGNOR TO THE LAMSON COMPANY, OF SYRACUSE, NEW YORK, A CORPORATION OF MASSACHUSETTS

DEFLECTOR MECHANISM

Application filed February 7, 1930. Serial No. 426,672.

This invention relates to a system for handling material as well as to apparatus for conveying and for transferring material from one conveyor to another conveyor or other desired station.

Apparatus of the class described is often used for carrying material bearing labels or other indicia in which event it becomes desirable to have the labels arranged so that they may be seen without further handling of the material, especially while in motion on the conveyor. While a conveyor may be loaded so that all labels or the like will be visible from a given direction, it frequently happens that the load must be transferred to another conveyor which may be operating in a different direction from that followed by the first conveyor. Under these conditions it becomes advantageous to have means for effecting the transfer and also for assuring that the transferred material will occupy approximately the same relative positions as on the first conveyor.

Objects of the present invention are to improve the art of handling material; to provide improved apparatus for transferring material from one conveyor to another and for arranging the transferred material in approximately the same relative positions as it occupied on the first conveyor; and to provide apparatus for these purposes of simple and efficient and yet rugged and durable construction.

In accordance with the present invention a system for conveying material may comprise traveling conveyors arranged for carrying material in different directions, the conveyors preferably being in relatively close proximity at some points or stations for facilitating transfer of material from one conveyor to another, although, should this be found to be inconvenient or not feasible under some conditions, the main conveyors may be spaced farther apart and auxiliary conveyors or similar means may be provided for assisting in transferring material. During transfer the material is turned through an angle corresponding approximately to the difference in the direction of motion of the two conveyors so that labeled objects will face in approximately the same direction with respect to the direction of motion while on the second conveyor as while on the first. For example, when the conveyors move in directly opposite directions, the material is turned through approximately 180°, while if the conveyors operate at right angles, the material is turned through approximately 90°, and so on. This assures that once the labels are arranged so they may be seen, this relationship will be preserved until the material is removed or otherwise discharged from the conveying system.

Turning of the material is effected in part by the relative movement of the conveyors at points of transfer, but as this alone is insufficient, means are provided for positively moving the material transversely of one conveyor and for turning the material through a sufficient angle during this transverse movement to assure proper arrangement after transfer. As the relative motion of the conveyors is responsible for a portion of the turning movement, it is immaterial in so far as this feature is concerned whether the conveyors are close together or far apart, although it is advantageous for other reasons to have the conveyors in relatively close proximity at points of transfer. Objects are often placed close together on a conveyor, and it is therefore important that turning and transfer be effected without arresting the forward motion of any object, since otherwise the first object would then impede the progress of the one following and so on. However, by moving and guiding an object diagonally across a conveyor the forward motion of the object may be made to assist in turning the same, while the diagonal motion with respect to the conveyor allows sufficient forward movement to avoid impeding the progress of following articles.

In the drawings:

Figs. 1 and 2 respectively illustrate in plan and elevation a portion of a conveyor system in which is incorporated one form of a deflector mechanism embodying this invention;

Figs. 3 and 4 respectively illustrate in plan and elevation another form of deflector mechanism embodying this invention;

Fig. 5 is an enlarged view of a circuit maker shown in Fig. 3; and

Fig. 6 illustrates in elevation the manner in which the circuit maker shown in Fig. 5 operates with a multiple frame member.

Figs. 1 and 2 illustrate a conveyor system in which a number of gravity rollers 12 are arranged to serve as a loading platform from which material may be delivered to the traveling belt 31 and thence, through mechanism about to be described, to a traveling belt 20 parallel to the belt 31 and by which the material is transported in a direction opposite to that by which it is transported on the belt 31. The belt 31 is operable over end drums or pulleys 32, 33, suitable idler pulleys 34 and 36 being arranged to guide the under course of the belt for keeping the belt taut. The pulley or drum 33 shown on the right, may be mounted in bearings carried by an end platform, indicated generally at 37, and comprising corner posts 38 which support a table 39 on which is mounted a prime mover, such as an electric motor 41, for supplying power to the apparatus. The motor shaft 42 is connected to the shaft 43 of a reducing set 44 by a coupling 46, and power is transmitted from the reducing set over a belt 47 mounted upon a pulley 48 carried by the end drum 33, power being transmitted through this belt for operating the traveling conveyor. Power for operating the transferring or deflecting belts is also transferred from the end drum 33 by means of a belt 49 operating over a pulley 51 on the end drum and over a pulley 52 mounted upon a shaft 53 carried in bearings 54 supported by side frame members 56, this shaft being operatively connected with the deflector belt shaft 57 through beveled gearing 58. The belt deflector 55 is mounted over pulleys carried on shafts 57, 59 which operate in vertical bearings 60. For the purpose of preventing deflection and stretching of the deflector belt due to impacts or other contact with objects carried by the traveling conveyor, a rigid surface is arranged adjacent the under side of this belt, such as, for example, a flat plate 61 (Fig. 1). To assist in supporting material at points of transfer a roller 62 is disposed longitudinally between the conveyors and mounted in fixed bearings 63. This roller is operated in synchronism with the conveyors by power transmitted from the pulley shaft 57 through beveled gearing 64 to a horizontally disposed shaft 66 mounted in fixed bearings 67 beneath the conveyor belt. This horizontal shaft carries a pulley 68 over which a belt 69 operates to transmit power to the pulley 71 carried by the roller.

In the operation of the apparatus thus far described, the load for the conveyor is arranged on the gravity rollers with labels or other indicia facing in the desired direction, as forwardly, so that inspectors or others may observe the labels without further manipulating or handling of the material, and when thus arranged the load is moved over the gravity rollers onto the conveyor. As the objects, for example cartons, approach the deflector belt, a forward edge or corner thereof is engaged by the belt and the object is moved transversely and diagonally of the conveyor, the movement being continuous and the object being pushed or guided over the roller and onto the adjacent conveyor. During this operation the deflector belts are responsible for a considerable portion of the turning movement, but it will also be apparent that the relative motion of the two main conveyors 31 and 20 is also effective for assisting in turning these objects. Where cartons, for example of rectangular shape and of dimensions approaching the width of the conveyor, are to be transferred, it may happen under some conditions that a corner or other portion of such an object would project over the edges of the conveyors during transfer, and for avoiding occurrences of this kind and preserving the original arrangement of the articles comprising the load, stationary buffing walls 72 are arranged to extend longitudinally of each conveyor along the edge thereof which is remote from the other conveyor. Each wall is spaced a sufficient distance from the edge of its conveyor to engage such cartons or the like without undue shock or impact and is inclined inwardly, preferably at a point (73) so as to guide the objects moving from or onto the carrying surface of the conveyor. It will be understood, of course, that these buffing walls are more in the form of precautionary features and are not essential to the practice of the invention, for obviously if the conveyors were wider, the occasion for their use would not arise.

It will also be apparent that the portion of the turning movement which is due to the relative motion of the two conveyors would take place to the same extent whether the conveyors 31 and 20 are spaced closely adjacent each other as illustrated in Figs. 1 and 2, or whether they are spaced farther apart and a number of rollers, such as the roll 62, or even an auxiliary conveyor, were interposed between the two main conveyors for carrying objects from one to the other. To be effective for assisting in turning the objects through the proper angle, the deflector belts should operate at greater speed than that of the conveyor with which they cooperate. For example, if the conveyor 31 operates at a speed of sixty feet per minute, it may be desirable to have the deflector belt 55 operate at a speed of eighty feet per minute. It will be understood, of course, that these speeds are merely illustrative of the principles of operating the device and that the speeds will vary under different conditions. It will also be seen that the two main conveyors 31 and 20 may be placed so near together that no movable supporting surface, such as the longitudinally disposed roller 62, will be required and, furthermore, that even when such rollers are provided, it is not necessary that they be operated in synchronism with the main conveyors, as it will be clear that such rollers may be merely idler or gravity rollers.

The apparatus just described for effecting a transfer and also for effecting a turning movement of material carried by the conveyor has been illustrated as of the type intended to be located permanently in a given position. It frequently happens, however, that from time to time the character of the load may change or the manner in which the load is to be disposed of may change, so that it is desirable to be able to change the points of transfer from one location to another, and for the purpose of facilitating rearrangement of points of transfer I have provided transfer apparatus, illustrated in Figs. 3 and 4, which may be readily shifted into and removed from the operating position. In these figures the deflector belt 75 operates over pulleys 76, 77 mounted in brackets 78 carried by a longitudinal frame member 79 and a motor 81 or other prime mover is mounted on a bracket 82 directly on the frame member. Power for operating the deflector belt is transmitted from the motor shaft through beveled gearing 83 to one of the pulleys, preferably to pulley 77. The deflector belt 75, operating motor 81 and the frame are supported for pivotal movement so that this belt may be moved either to the position shown in which it is effective for transferring and turning material, or it may be moved to a position at one side of the traveling conveyor to allow material to pass this particular point of transfer. The mechanism for accomplishing these results comprises a vertical shaft 86, the upper end of which is fixedly mounted in a bracket 87 attached to the ceiling or other rigid structure, and similarly the lower end of this shaft may be fixedly mounted in a bracket 88 attached to the side frame 89 of the conveyor or other suitable foundation structure. A bracket 91 carried by the frame of the deflector belt is journaled upon this shaft, and a diagonal brace 92 attached to the outer or free end of the deflector belt frame is also journaled upon the shaft at a point spaced well above the journal provided in the bracket. In this way a rugged, durable, and yet simple and relatively inexpensive construction is provided for supporting deflector belts for movement to operative and to inoperative positions.

While these deflector belts may be moved manually to their operative or inoperative positions and any approved means may be provided for holding the belts in the desired positions, I prefer to provide power operated apparatus for moving the belts precisely to a predetermined position and for positively holding the belts in such positions. For these purposes a motor 96 or other prime mover is connected by a coupling 97 to a power reducing mechanism 98 having a vertical shaft 99 which is rotatable in response to operation of the motor. A crank arm 101 is keyed or otherwise fixedly connected to this vertical shaft and pivotally connected to a link 102 which is also pivotally connected to a bracket 103 attached to the deflector belt frame. The crank arm and the link are so arranged and proportioned that as the vertical shaft and the crank arm carried thereby moves through an angle of 180°, the deflector belt will be moved from its angular or diagonal position transversely of the main conveyor belt to a position at one side of the conveyor belt. The reducing set 98 is preferably of the type embodying worm gearing which serves to hold the parts in adjusted positions when the motor 96 is not operating.

Another arm 104 carrying a roller 105 is also fixedly mounted on shaft 99 and circuit breakers 106, 107 are disposed approximately 180° apart in the path of arm 104 and adapted to be tripped by the roller 105 on the arm as the shaft 99 is rotated.

Power for operating the motor 96 is transmitted through the line 108 in which the automatic starter switch 109 is interposed. A solenoid 111 is connected in a circuit C across the line and is adapted to hold the starter switch 109 in closed position. The circuit breakers 106 and 107 are connected in series in the circuit C and a circuit maker 112 is connected in the circuit C in parallel with the circuit breaker 107, while a circuit maker 113 is connected in the circuit C in parallel with the circuit breaker 106. It will be understood that when the circuit C is broken by either circuit breaker 106 or 107, the solenoid 111 will be deenergized and the starter switch 109 will be held open so that the motor 96 will not operate, and of course when the circuit is completed through the solenoid, the starter switch 109 will be held closed and the motor 96 will operate until such time as the circuit is again broken. With the parts in the position shown on the drawings, the circuit C is broken by the circuit breaker 107.

The circuit makers 112 and 113 are disposed above the conveyor and in the path of travel of the load carried thereby. Objects, such as cartons, comprising the load which are to be transferred at this point of transfer carry pins or other projections which are engageable with the circuit maker 113. Other objects which are not to be transferred at this particular point, but which are to continue their travel on the conveyor, carry projections which are engageable with the circuit maker 112. Assuming, for example, that an object should engage the circuit maker 112, the circuit, which is now broken at the circuit breaker 107, would be completed by the circuit maker 112 through the breaker 106; the solenoid 111 would be energized to close the starter switch 109; and the motor 96 would operate to move the deflector belt to a position at one side of the conveyor, so that such objects thereon might pass this point of transfer. After the motor 96 has moved the deflector belt to the proper position at one side of the conveyor, the circuit through the solenoid 111 will be broken by the tripping of the circuit breaker 106 by the arm 104. The deflector belt will then remain in a position at one side of the conveyor until such time as the circuit C is completed through the circuit maker 113 when the motor will again be operated to move the deflector belt to the position shown on the drawings, and, of course, when the belt reaches this position the circuit C will be broken by the circuit breaker 107. The circuit makers 112 and 113 may be supported from transverse members 114 disposed above the conveyor or in any other approved manner. While the circuit breakers have been shown as being arranged 180° apart, it will be understood that this is merely illustrative and that other arrangements may be made which will likewise be effective for moving these deflector belts through the desired angles.

The circuit through the motor 81 is completed as the deflector belt moves to its operative position transversely of the main conveyor, and this circuit is broken as the deflector belt moves away from its operative position, so that the deflector belt is always kept running while loads are being advanced to engage it. Power for operating the motor 81 is transmitted through the line 116 in which the automatic starter switch 117 is interposed. This switch is held closed by a solenoid 118, and when the solenoid is deenergized the switch is held open so that the motor will not operate. The circuit C' of the solenoid 118 is open at the terminals 119 (Fig. 5) disposed on the stationary bracket 121. An arm 122 is mounted to pivot on this bracket and adapted in one position to complete the circuit across the terminals 119. A tension spring 123 connected to this arm and to some stationary member, as to the bracket, normally urges the contact arm away from the terminals 119 so that the circuit is broken. The outer end of this arm carries a roller 124 which is engageable with the lower portion of the movable frame 79 of the deflector belt, and it will be understood that as this frame moves transversely of the main conveyor it will engage the roller 124 and force the contact arm across the terminals 119 completing the circuit C', energizing the solenoid 118, and closing the automatic starter switch 117, thus causing the motor 81 to operate. The parts preferably are so arranged that the circuit C' is completed as the deflector belt is approximately half way across the main conveyor, as at the position in which the pulley 76 is located as indicated in broken lines at 125 (Fig. 3), and likewise when the deflector belt moves toward its inoperative position the power for operating the motor 81 will be cut off as the deflector belt reaches the position 125 due to the action of the spring 123 which snaps the arm 122 away from the terminals 119, thereby deenergizing the solenoid and allowing the starter switch 117 to be thrown open.

I claim:

1. The combination with a main conveyor, of a second conveyor, a traveling deflector belt by which articles are transferred from the main conveyor to the second conveyor, a frame for supporting the deflector belt for bodily movement between an inoperative position at one side of the main conveyor and an operative position transversely of the main conveyor in which the articles are transferred, means for moving the frame between such positions, means for starting the travel of the belt as the frame moves toward the operative position and for stopping such travel as the frame moves away from the operative position, and means disposed in the path of travel of articles on the main conveyor for actuating the frame moving means and controlling the traveling movement of the belt.

2. The combination with a main conveyor, of a second conveyor, a traveling deflector belt by which articles are transferred from the main conveyor to the second conveyor, a frame for supporting the deflector belt for bodily movement between an inoperative position at one side of the main conveyor and an operative position transversely of the main conveyor in which the articles are transferred, means for moving the frame between such positions, means for starting the travel of the belt as the frame moves toward the operative position and for stopping such travel as the frame moves away from the operative position, and means disposed in the path of travel of articles on the main conveyor for actuating the frame moving means to move the frame from the inoperative to the operative position and for actuating the belt starting means as the frame moves toward the operative position.

3. The combination with a main conveyor, of a second conveyor, a traveling deflector belt by which articles are transferred from the main conveyor to the second conveyor, a frame for supporting the deflector belt for bodily movement between an inoperative position at one side of the main conveyor and an operative position transversely of the main conveyor in which the articles are transferred, means for moving the frame between such positions, means for starting the travel of the belt as the frame moves toward the operative position and for stopping such travel as the frame moves away from the operative position, and means disposed in the path of travel of articles on the main conveyor for actuating the frame moving means to move the frame from the operative to the inoperative position and for actuating the belt stopping means as the frame moves toward the inoperative position.

4. In an apparatus of the class described, the combination of a conveyor belt, a deflector belt operable in planes approximately normal to the conveying surface of the deflector belt, a movable frame on which the deflector belt is supported for bodily movement from an inoperative position at one side of the conveyor belt to an operative position transversely of the conveyor belt, and means including a frame actuated member effective only as the deflector belt approaches its operative position for driving the deflector belt.

5. In an apparatus of the class described, the combination of a conveyor belt, a deflector belt operable in planes approximately normal to the conveying surface of the deflector belt, means for supporting the deflector belt for movement from an inoperative position at one side of the conveyor belt to an operative position transversely of the conveyor belt, means for operating the deflector belt, and means effective as the deflector belt is moved toward its inoperative position for rendering the operating means ineffective.

6. In an apparatus of the class described, the combination of a conveyor belt, a deflector belt operable in planes approximately normal to the conveying surface of the deflector belt, means for supporting the deflector belt for movement from an inoperative position at one side of the conveyor belt to an operative position transversely of the conveyor belt, a motor for operating the deflector belt, a switch for controlling the motor, means tending to urge the switch to open position, and means effective as the deflector belt approaches its operative position for closing the switch.

7. In an apparatus of the class described, the combination of a conveyor belt, a deflector belt operable in planes approximately normal to the conveying surface of the conveyor belt, a frame for supporting the deflector belt, means for supporting the frame for movement from a position at one side of the conveyor in which the deflector belt is inoperative to a position transversely of the conveyor in which the deflector belt is operative, a motor mounted on the frame for operating the deflector belt, a switch for controlling the motor, means for urging the switch to open position, and means engageable with the frame as the deflector belt approaches its operative position for closing the switch.

8. The combination with conveyors operating in approximately opposite directions, of means for transferring articles from one conveyor to the other and for deflecting the articles to face them in the direction of motion of said other conveyor, said means including a traveling belt disposed substantially diagonally across the first conveyor and means for driving said belt at a speed greater than that of the articles on the first conveyor, each article being faced diagonally of the first conveyor by the contact of the belt with the forward portion of the article and being delivered to the second conveyor and faced thereon in the direction of travel of such conveyor by the contact of the belt with the rearward portion of the article, and buffers disposed longitudinally of each conveyor on the side remote from the other conveyor for guiding the articles during the transfer thereof.

Signed by me, LAVONT C. ALLEN, at Syracuse, N. Y., this 28th day of January 1930.

LAVONT C. ALLEN.